US011176645B2

(12) United States Patent
Ikemoto

(10) Patent No.: US 11,176,645 B2
(45) Date of Patent: Nov. 16, 2021

(54) APPARATUS, METHOD, AND STORAGE MEDIUM FOR CONVERTING RESOLUTION OF IMAGES BASED ON REFLECTION CHARACTERSISTICS OF AN OBJECT

(71) Applicant: CANON KABUSHIKI KAISHA, Tokyo (JP)

(72) Inventor: Sho Ikemoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/661,818

(22) Filed: Oct. 23, 2019

(65) Prior Publication Data

US 2020/0134790 A1 Apr. 30, 2020

(30) Foreign Application Priority Data

Oct. 30, 2018 (JP) .............................. JP2018-204380

(51) Int. Cl.
*G06K 9/32* (2006.01)
*G06T 5/00* (2006.01)
(Continued)

(52) U.S. Cl.
CPC ............ *G06T 5/006* (2013.01); *G06T 3/4007* (2013.01); *G06T 5/50* (2013.01); *G06T 15/506* (2013.01);
(Continued)

(58) Field of Classification Search
CPC . G06F 3/005; G06T 3/20; G06T 5/006; G06T 15/506; G06K 9/00604; G06K 9/2036
See application file for complete search history.

(56) References Cited

U.S. PATENT DOCUMENTS

2003/0026458 A1* 2/2003 Nahum ...................... G06T 7/32
382/106
2003/0128207 A1* 7/2003 Sawada ................... G06T 7/514
345/419
(Continued)

FOREIGN PATENT DOCUMENTS

JP 2003-203220 A 7/2003

OTHER PUBLICATIONS

Nishino et al., "Determining reflectance parameters and illumination distribution from a sparse set of images for view-dependent image synthesis," 2001, Proceedings Eighth IEEE International Conference on Computer Vision. ICCV 2001, Vancouver, BC, Canada, 2001, pp. 599-606 vol. 1.*

(Continued)

*Primary Examiner* — Guillermo M Rivera-Martinez
(74) *Attorney, Agent, or Firm* — Canon U.S.A., Inc. IP Division

(57) ABSTRACT

An apparatus is configured to convert a resolution of each of a plurality of images acquired by imaging an object under a plurality of geometric conditions based on an imaging position and a position of a light source that irradiates the object with light. The apparatus includes a determination unit configured to determine a resolution at which a number of peaks is one regarding a peak of a pixel value that emerges in a corresponding relationship between the pixel value and a geometric condition at each of pixel positions in the plurality of images, and a conversion unit configured to convert the resolution of each of the plurality of images into the determined resolution.

19 Claims, 10 Drawing Sheets

(51) Int. Cl.
*G06T 5/50* (2006.01)
*G06T 15/83* (2011.01)
*G06T 15/50* (2011.01)
*G06T 3/40* (2006.01)

(52) U.S. Cl.
CPC .... *G06T 15/83* (2013.01); *G06T 2207/20216* (2013.01)

(56) References Cited

U.S. PATENT DOCUMENTS

| | | | | |
|---|---|---|---|---|
| 2005/0190986 | A1* | 9/2005 | Sakurai | H04N 1/387 382/275 |
| 2006/0159368 | A1* | 7/2006 | Kondo | G06T 1/00 382/299 |
| 2008/0186390 | A1* | 8/2008 | Sato | G06T 3/4053 348/222.1 |
| 2009/0304299 | A1* | 12/2009 | Motomura | H04N 5/23245 382/254 |
| 2011/0102551 | A1* | 5/2011 | Iwasaki | G06T 15/50 348/46 |
| 2013/0044213 | A1* | 2/2013 | Kirmani | G03B 39/00 348/135 |
| 2013/0321675 | A1* | 12/2013 | Cote | H04N 9/045 348/242 |
| 2014/0267420 | A1* | 9/2014 | Schowengerdt | G06F 3/011 345/633 |
| 2017/0162107 | A1* | 6/2017 | Ninan | G09G 3/3426 |
| 2018/0130253 | A1* | 5/2018 | Hazel | G06T 15/005 |
| 2019/0068973 | A1* | 2/2019 | Hamilton | H04N 19/14 |
| 2020/0112670 | A1* | 4/2020 | Kamiya | H04N 1/387 |

OTHER PUBLICATIONS

Hara et al., "Light source position and reflectance estimation from a single view without the distant illumination assumption," 2005, IEEE Transactions on Pattern Analysis and Machine Intelligence, vol. 27, No. 4, pp. 493-505, Apr. 2005.*

* cited by examiner

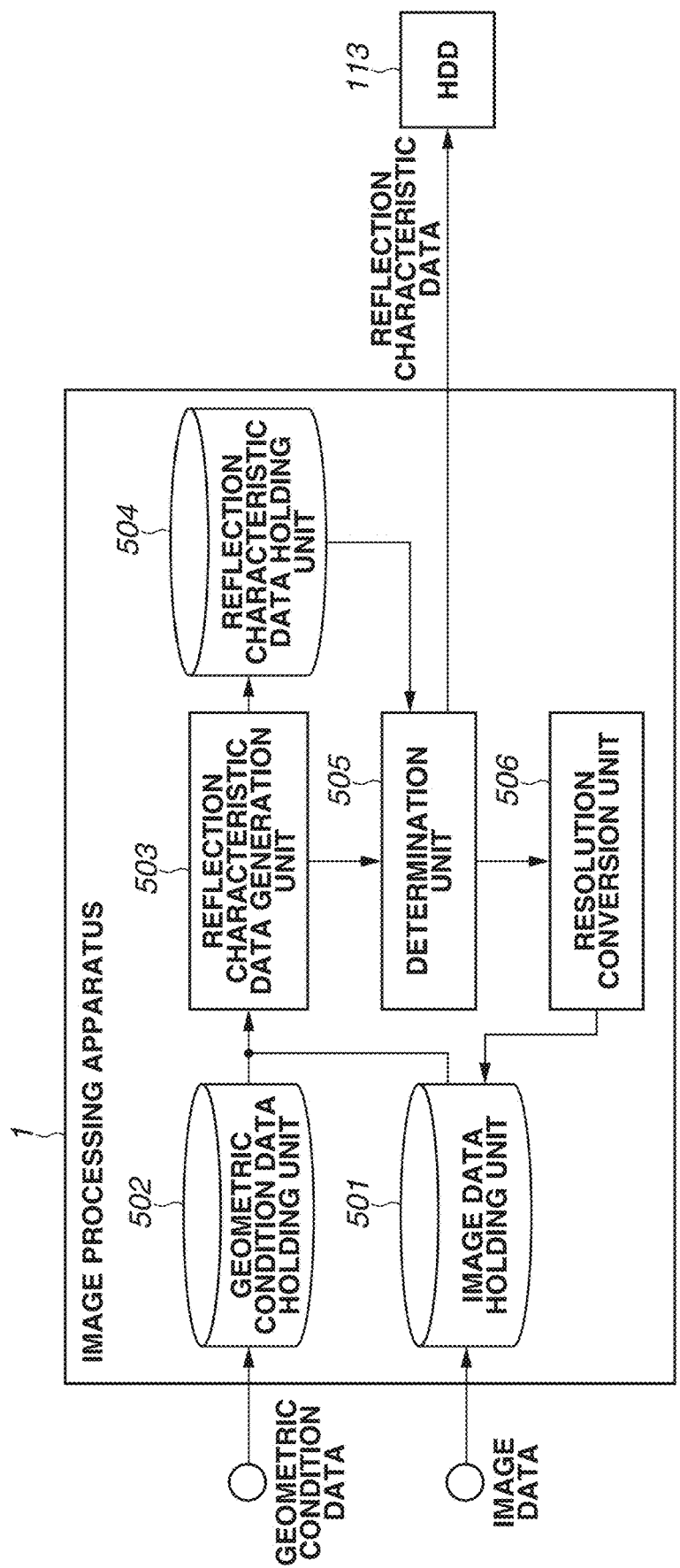

APPARATUS, METHOD, AND STORAGE MEDIUM FOR CONVERTING RESOLUTION OF IMAGES BASED ON REFLECTION CHARACTERSISTICS OF AN OBJECT

BACKGROUND OF THE INVENTION

Field of the Invention

The aspect of the embodiments relates to an image processing technique for acquiring a reflection characteristic of an object.

Description of the Related Art

There is known a technique for acquiring a behavior of reflected light on an object as a reflection characteristic to reproduce a texture of the object. Japanese Patent Application Laid-Open No. 2003-203220 discloses a technique for acquiring a reflection characteristic of an object by using a plurality of pieces of image data acquired by carrying out imaging while changing a direction of a light source or an observation direction.

In some cases, a light amount corresponding to one pixel in a captured image may be small depending on an imaging condition and the reflection characteristic of an object. In such cases, a ratio of noise to a pixel value increases at each of pixels in the captured image. The conventional technique like Japanese Patent Application Laid-Open No. 2003-203220 may have failed to accurately acquire the reflection characteristic of an object based on the captured image having the pixel value significantly affected by the influence of the noise.

SUMMARY OF THE INVENTION

According to an aspect of the embodiments, an apparatus is configured to convert a resolution of each of a plurality of images acquired by imaging an object under a plurality of geometric conditions based on an imaging position and a position of a light source that irradiates the object with light. The apparatus includes a determination unit configured to determine a resolution at which a number of peaks is one regarding a peak of a pixel value that emerges in a corresponding relationship between the pixel value and a geometric condition at each of pixel positions in the plurality of images, and a conversion unit configured to convert the resolution of each of the plurality of images into the determined resolution.

Further features of the disclosure will become apparent from the following description of exemplary embodiments with reference to the attached drawings.

BRIEF DESCRIPTION OF THE DRAWINGS

FIG. 5 is a block diagram illustrating functional configuration of the image processing apparatus.

DESCRIPTION OF THE EMBODIMENTS

In the following description, a first exemplary embodiment will be described. First, a relationship between a resolution of a captured image and noise will be described. When an image is captured at a high resolution at the time of imaging an object, a region on an object surface that corresponds to one pixel in the captured image is smaller than when the same object is imaged at a lower resolution. Thus, when the image is captured at the high resolution at the time of imaging the object, a light reception amount at one pixel tends to be smaller than when the same object is imaged at the lower resolution. In a digital captured image, when the light reception amount at one pixel is converted into a pixel value, the light reception amount is converted into a pixel value containing noise based on a condition at the time of the imaging. When the image is captured at the high resolution at the time of imaging the object, the noise is contained at a relatively higher ratio in the pixel value than when the same object is imaged at the lower resolution. Thus, a reflection characteristic calculated based on the captured image at the high resolution ends up in an inaccurate reflection characteristic significantly affected by the influence of the noise. Therefore, the present exemplary embodiment reduces the influence of the noise on the reflection characteristic calculated based on the captured image by reducing the resolution of the captured image.

<Hardware Configuration of Image Processing Apparatus>

Figure 1:
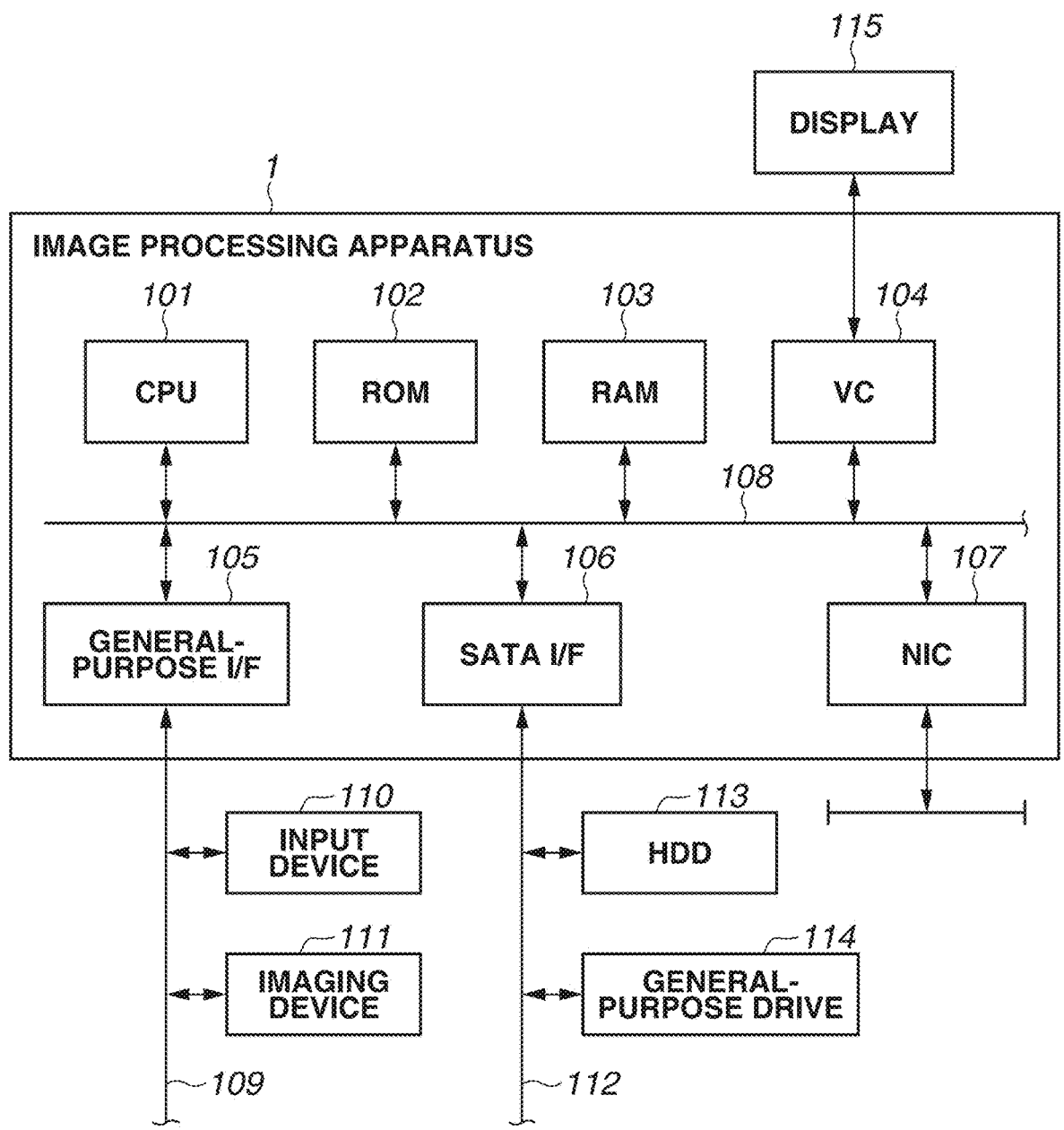
FIG. 1 is a block diagram illustrating a hardware configuration of an image processing apparatus.

A hardware configuration of an image processing apparatus according to the present exemplary embodiment will be described with reference to FIG. 1. FIG. 1 is a block diagram illustrating a hardware configuration of an image processing apparatus 1. The image processing apparatus 1 is, for example, a computer, and includes a central processing unit (CPU) 101, a read only memory (ROM) 102, and a random access memory (RAM) 103. Further, the image processing apparatus 1 includes a video card (VC) 104, a general-purpose interface (I/F) 105, a serial Advanced Technology Attachment (SATA) (serial ATA) I/F 106, and a network interface card (MC) 107. The CPU 101 executes an operating system (OS) and various kinds of programs stored in the ROM 102, a hard disk drive (HDD) 113, and the like with use of the RAM 103 as a work memory therefor. Further, the CPU 101 controls each configuration via a system bus 108. For processing according to flowcharts that will be described below, a program code stored in the ROM 102, the HDD 113, or the like is loaded into the RAM 103 and executed by the CPU 101. A display 115 is connected to the VC 104. An input device 110, such as a mouse and a keyboard, and an imaging device 111 are connected to the general-purpose I/F 105 via a serial bus 109. The HDD 113 and a general-purpose drive 114 that reads and writes data from and into various kinds of recording media are connected to the SATA I/F 106 via a serial bus 112. The NIC 107 inputs and outputs information between the image processing apparatus 1 and an external apparatus. The CPU 101 uses the HDD 113 and the various kinds of recording media mounted on the general-purpose drive 114 as locations to store various kinds of data. The CPU 101 displays a graphical user interface (GUI) provided by a program on the display 115, and receives an input such as a user instruction received via the input device 110.

<Functional Configuration of Image Processing Apparatus>

Figure 2:
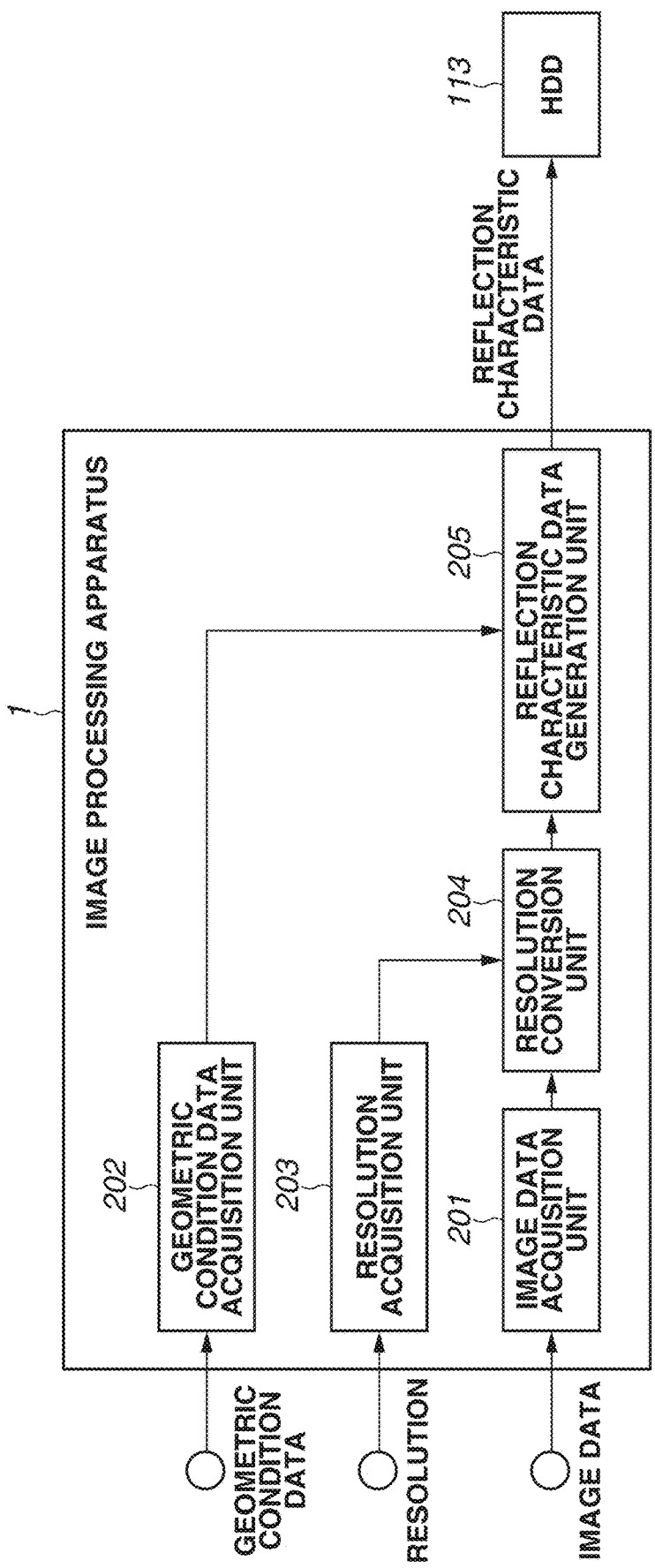
FIG. 2 is a block diagram illustrating a functional configuration of the image processing apparatus.

FIG. 2 is a block diagram illustrating a functional configuration of the image processing apparatus 1. The CPU 101 executes the program stored in the ROM 102 with use of the RAM 103 as the work memory therefor, by which the image processing apparatus 1 functions as the functional configuration illustrated in FIG. 2. The processing that will be described below does not have to be entirely performed by the CPU 101, and the image processing apparatus 1 may be configured such that a part or a whole of the processing is performed by one or a plurality of processing circuits other than the CPU 101.

The image processing apparatus 1 includes an image data acquisition unit 201, a geometric condition data acquisition unit 202, a resolution acquisition unit 203, a resolution conversion unit 204, and a reflection characteristic data generation unit 205. The image data acquisition unit 201 acquires image data acquired by imaging an object. The image data acquisition unit 201 according to the present exemplary embodiment acquires a plurality of pieces of image data acquired by imaging the object while changing positions and orientations of a light source and the imaging device 111 from a storage device such as the HDD 113. Assume that $I_n(x, y)$ represents a pixel value in the image indicated by the image data. In this case, n is an identification number of the captured image, and numbers of 1 to c are assigned to c captured images. The image data in the present exemplary embodiment is gray-scale image data, and the pixel value is a luminance value calculated from a red (R) value, a green (G) value, and a blue (B) value with use of a known method. Further, a resolution of the image represented by the image data is recorded in the image data as metadata.

The geometric condition data acquisition unit 202 acquires geometric condition data indicating geometric conditions of light irradiation by the light source and light reception by the imaging device 111. The geometric condition is determined based on the positions and the orientations of the light source and the imaging device 111. More specifically, as the geometric condition data, the geometric condition data acquisition unit 202 acquires an observation vector indicating a direction from a surface of the object toward the imaging device 111, a light source vector indicating a direction from the surface of the object toward the light source, and an illumination intensity indicating an intensity of light with which the light source irradiates the object with respect to each of the captured images. As will be used herein, assume that $v_n$ represents the observation vector corresponding to the n-th captured image, $l_n$ represents the light source vector corresponding to the nth captured image, and $s_n$ represents the illumination intensity corresponding to the nth captured image. The resolution acquisition unit 203 acquires a resolution specified by the user.

The resolution conversion unit 204 converts the resolution of the image indicated by the image data acquired by the image data acquisition unit 201 based on the resolution acquired by the resolution acquisition unit 203. The reflection characteristic data generation unit 205 generates reflection characteristic data indicating a reflection characteristic of the object based on image data indicating an image at the converted resolution, and the geometric condition data.

<Processing Performed by Image Processing Apparatus>

Figure 3:
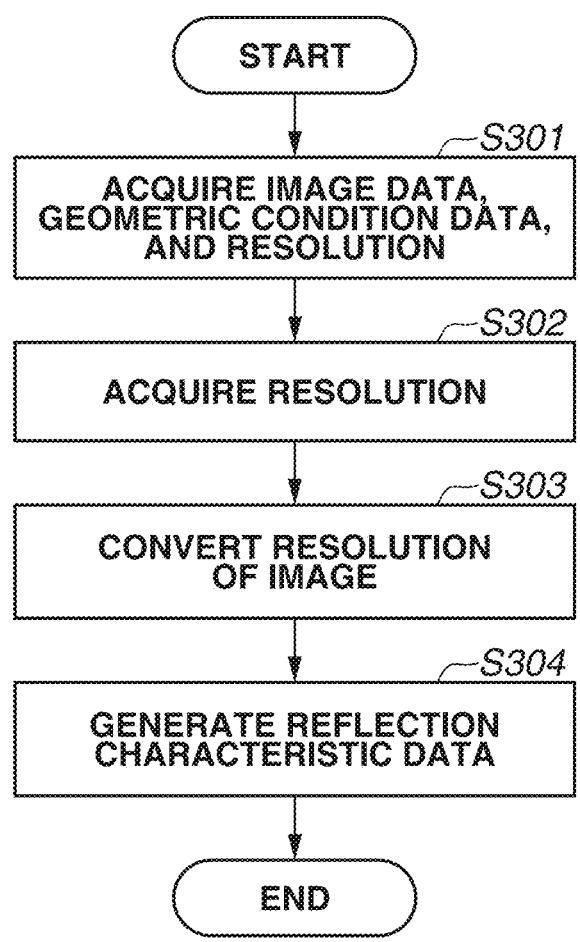
FIG. 3 is a flowchart illustrating processing performed by the image processing apparatus.

FIG. 3 is a flowchart of processing performed by the image processing apparatus 1. In the following description, details of the processing performed by the image processing apparatus 1 will be described with reference to FIG. 3. The following processing is started when an instruction to start the processing is received from the user.

In step S301, the image data acquisition unit 201 acquires the plurality of pieces of image data. Further, the geometric condition data acquisition unit 202 acquires the observation vector $v_n$, the light source vector $l_n$, and the illumination intensity $s_n$ corresponding to each of the plurality of pieces of image data. Further, the resolution acquisition unit 203 acquires the resolution specified by the user. The resolution acquisition unit 203 according to the present exemplary embodiment acquires the resolution input by the user via a user interface (UI), but may acquire a resolution stored in a storage device such as the HDD 113. The resolution acquired at this time is a resolution to be used to reduce the resolution of the image, and is thus assumed to be a lower value than the resolution of the image indicated by the image data acquired by the image data acquisition unit 201. Meanwhile, excessively reducing the resolution of the image ends up in a failure to accurately acquire the reflection characteristic that is to be calculated, and thus a resolution allowing the reflection characteristic to be accurately calculated while reducing the noise is to be identified in advance from, for example, a shape of the object. For example, one possible method is to calculate such a resolution that a plurality of peaks of a reflection intensity is not contained in a region corresponding to one pixel based on a direction of a normal line on the surface of the object.

In step S302, the resolution conversion unit 204 acquires a resolution A of the image represented by the image data and a resolution B acquired by the resolution acquisition unit 203. In step S303, the resolution conversion unit 204 converts the resolution of each of the respective images represented by the plurality of pieces of image data based on the resolution A and the resolution B. More specifically, the resolution conversion unit 204 reduces the resolution of the image with use of the known bicubic interpolation method in such a manner that the number of pixels in a vertical direction and the number of pixels in a horizontal direction in the image each match a value multiplied by B/A times. For example, in a case of B/A=¼, an image of 100 pixels in the vertical direction×100 pixels in the horizontal direction is converted into an image of 25 pixels in the vertical direction×25 pixels in the horizontal direction as a result of the resolution conversion. The method for converting the resolution is not limited to the bicubic interpolation method, and may be another method such as the known bilinear interpolation method.

In step S304, the reflection characteristic data generation unit 205 generates the reflection characteristic data representing the reflection characteristic of the object based on the image data indicating the image at the converted resolution, and the geometric condition data. More specifically, the reflection characteristic data generation unit 205 calculates a reflection characteristic parameter by fitting a reflection model to the pixel values in the image. At this time, assuming that $f(p, v_n, l_n)$ represents the reflection model subjected to the fitting, the reflection characteristic parameter $p(x, y)$ is calculated with use of an equation (1).

$$p = \underset{p}{\operatorname{argmin}} \sum_{1 \leq n \leq c} \left( f(p, v_n, l_n) - \frac{I_n(x, y)}{s_n} \right)^2. \quad \text{Equation (1)}$$

In the equation (1), p represents a vector indicating a parameter group held by the reflection model $f(p, v_n, l_n)$, and the reflection model used in the present exemplary embodiment is expressed by a Gaussian function having three parameters, a mean, a variance, and a scale. Further, $\operatorname{argmin}_p$ (Z) represents a function that returns the parameter p minimizing Z. The reflection characteristic parameter is calculated with respect to all pixel positions (x, y).

The reflection characteristic data generation unit 205 causes the calculated reflection characteristic parameter p(x, y) to be held at the pixel located at the pixel position (x, y) the reflection characteristic data. Here, the reflection characteristic data refers to data holding the reflection characteristic parameter each pixel. A plurality of parameters may be held at each pixel in one piece of reflection characteristic data, or the reflection characteristic data may be generated as pieces of data holding respective parameters at each pixel, like mean data, variance data, and scale data. The reflection characteristic data generation unit 205 outputs the generated reflection characteristic data to a storage device such as the HDD 113. A destination to which the reflection characteristic data is output is not limited to the storage device, and may be, for example, another device that performs processing based on the reflection characteristic data.

Beneficial Effects of First Exemplary Embodiment

In the above-described manner, the image processing apparatus 1 according to the present exemplary embodiment determines the resolution at which the number of peaks is one regarding the peak of the pixel value that emerges in the corresponding relationship between the pixel value and the geometric condition at each of the pixel positions in the plurality of images, and converts the resolution of each of the plurality of images into the determined resolution. The image processing apparatus 1 can acquire a similar beneficial effect to smoothing processing for reducing the noise by this processing for converting the resolution of the image. The image processing apparatus 1 thus can reduce the influence of the noise when acquiring the reflection characteristic of the object. Further, the image processing apparatus 1 can reduce cost required for the processing because a data amount of the image data can be reduced by lowering the resolution of the image.

Figure 4A:
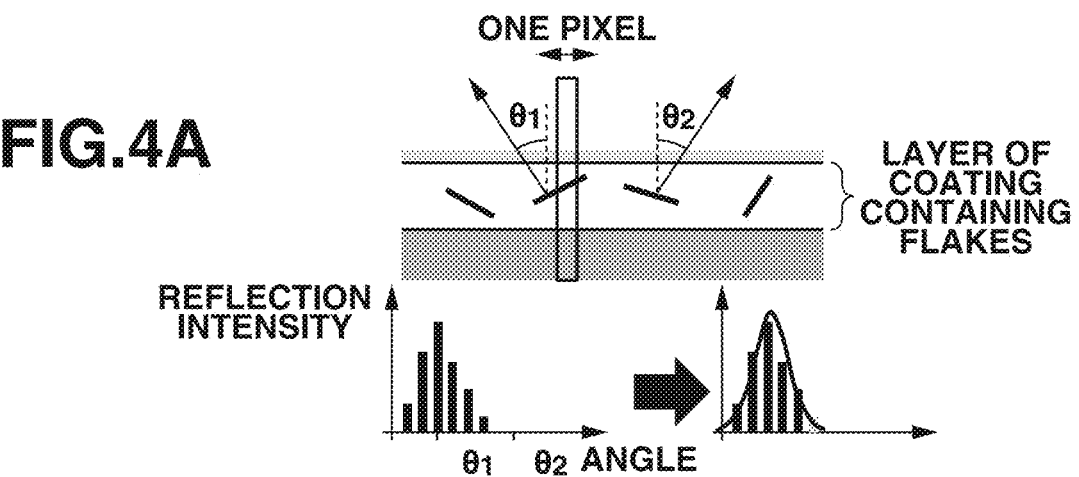
FIGS. 4A, 4B, and 4C each illustrate a relationship between a resolution of an image and a reflection characteristic.
Figure 4B:
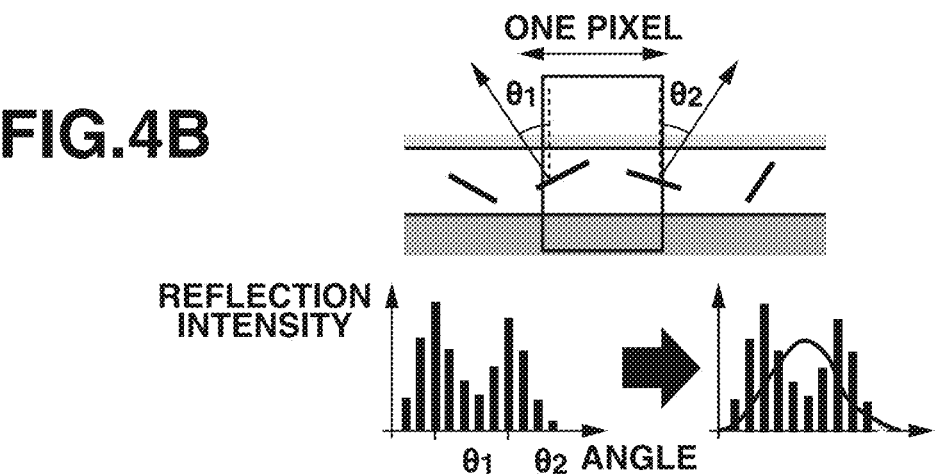
Figure 4C:
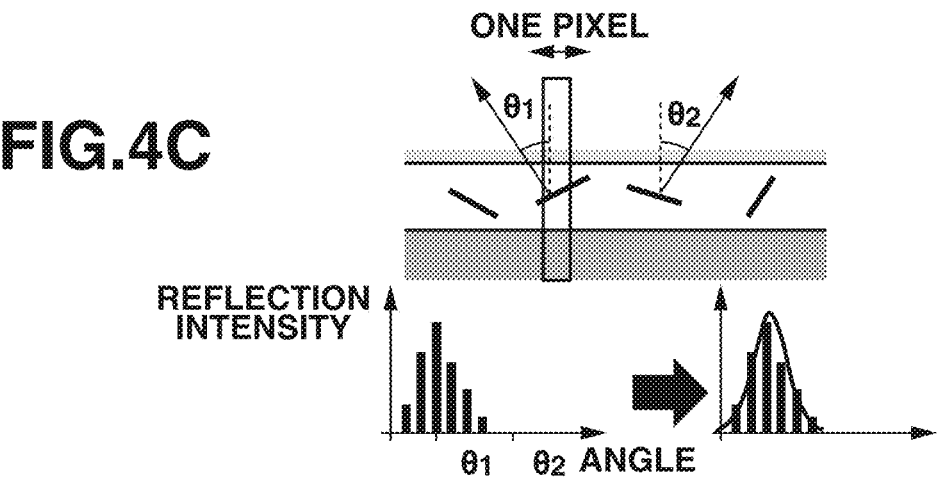

In the following description, a second exemplary embodiment will be described. In the first exemplary embodiment, the image processing apparatus 1 converts the resolution of the captured image used to calculate the reflection characteristic based on the resolution specified by the user. Meanwhile, excessively reducing the resolution of the image ends up in a failure to accurately acquire the reflection characteristic that is to be calculated with respect to some object. Examples of such objects include an object having a surface metallically coated with use of a coating material containing metallic flakes, and metal processed such that roughness is added to a surface thereof. FIGS. 4A, 4B, and 4C each illustrate a relationship between the resolution of the image acquired by imaging the metallically coated object and the reflection characteristic calculated based on the image.

When the image is captured at a high resolution and a region corresponds to one pixel on the object is small as illustrated in FIG. 4A, the pixel value is susceptible to the influence of the noise. This influence of the noise impedes the accurate calculation of the reflection characteristic. As illustrated in FIG. 4B, when the image is captured at a low resolution and contains a plurality of flakes oriented in different directions in the region corresponding to one pixel, the peak of the reflection intensity emerges in a direction according to the orientation of each of the flakes contained in this region. When the reflection characteristic is calculated, a unimodal function having a highest reflectance in a direction of specular reflection with respect to a direction in which the light is incident ("unimodal" means that a reflectance has one peak) is approximated to a pixel value, like the first exemplary embodiment. Thus, if a plurality of peaks is observed at one pixel as illustrated in FIG. 4B when the reflection characteristic is calculated, the pixel values cannot conform with a shape of the reflection model and an error is undesirably generated in a calculation result. Therefore, in one embodiment, the reflection characteristic is calculated after reducing the resolution of the image as far as a resolution at which the plurality of peaks is not observed at one pixel as illustrated in FIG. 4C.

In the present exemplary embodiment, it is identified how far the resolution of the image is to be reduced based on the reflection characteristic of the object, and the reflection characteristic of the object is calculated based on the image having the resolution reduced so as to prevent the plurality of peaks from being observed at one pixel. The image processing apparatus 1 according to the present exemplary embodiment has a similar hardware configuration to that of the first exemplary embodiment, and therefore a description thereof will be omitted below. In the following description, the present exemplary embodiment will be described mainly focusing on differences between the present exemplary embodiment and the first exemplary embodiment. The present exemplary embodiment will be described assigning the same reference numerals to similar configurations.

<Functional Configuration of Image Processing Apparatus>

FIG. 5 is a block diagram illustrating a functional configuration of the image processing apparatus 1. The image processing apparatus 1 includes an image data holding unit 501, a geometric condition data holding unit 502, a reflection characteristic data generation unit 503, a reflection characteristic data holding unit 504, a determination unit 505, and a resolution conversion unit 506. The image data holding unit 501 is a holding unit for holding the plurality of pieces of image data acquired by imaging the object while changing the positions and the orientations of the light source and the imaging device 111, and image data indicating an image at a resolution converted by the resolution conversion unit 506. The geometric condition data holding unit 502 is a holding unit for holding the geometric condition data indicating the geometric conditions of the light irradiation by the light source and the light reception by the imaging device 111. The reflection characteristic data generation unit 503 generates the reflection characteristic data indicating the reflection characteristic of the object based on the plurality of pieces of image data and the geometric condition data. The reflection characteristic data holding unit 504 is a holding unit for holding the reflection characteristic data generated by the reflection characteristic data generation unit 503. The determination unit 505 determines whether the resolution of the image is to be reduced based on the plurality of pieces of image data, the geometric condition data, and the reflection characteristic data. The resolution conversion unit 506 reduces the resolution of the image indicated by the image data.

<Processing Performed by Image Processing Apparatus>

Figure 6:
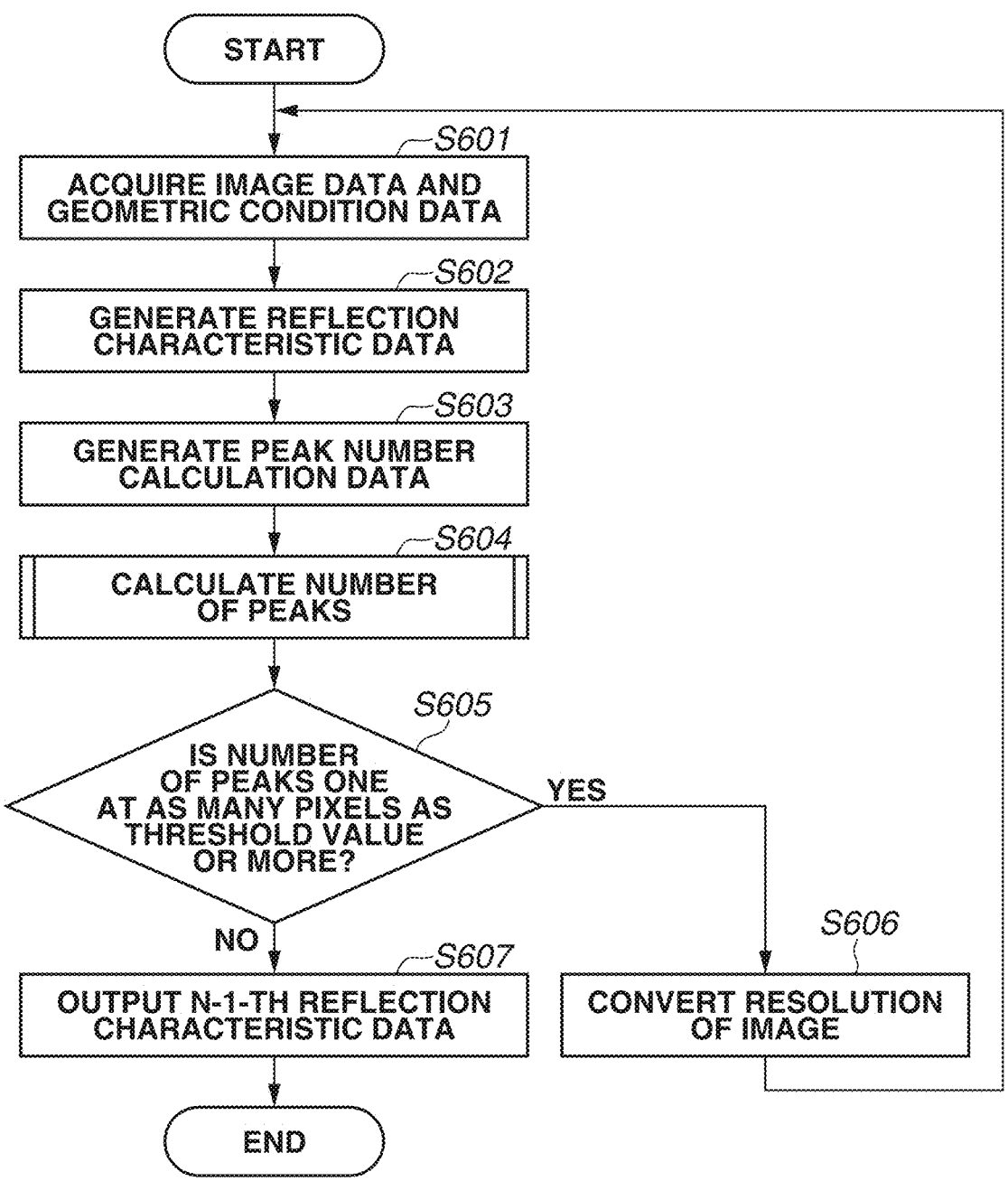
FIG. 6 is a flowchart illustrating processing performed by the image processing apparatus.

FIG. 6 is a flowchart illustrating processing performed by the image processing apparatus 1. In the following description, details of the processing performed by the image processing apparatus 1 will be described with reference to FIG. 6. The following processing is started when an instruction to start the processing is received from the user.

In step S601, the reflection characteristic data generation unit 503 acquires the plurality of pieces of image data from the image data holding unit 501. Further, the reflection characteristic data generation unit 503 acquires the observation vector, the light source vector, and the ilium nation intensity from the geometric condition data holding unit 502 with respect to each of the captured images. In step S602, the reflection characteristic data generation unit 503 generates the reflection characteristic data based on the plurality of pieces of image data and the geometric condition data. The method for generating the reflection characteristic data is similar to step S304 according to the first exemplary embodiment, and therefore a description thereof will be omitted here. The reflection characteristic data generation unit 503 outputs the generated reflection characteristic data to the reflection characteristic data holding unit 504. In the present exemplary embodiment, since a plurality of pieces of reflection characteristic data may be generated, the reflection characteristic data generation unit 503 outputs the reflection characteristic data to the reflection characteristic data holding unit 504 after numbering it. Assume that the reflection characteristic data output to the reflection characteristic data holding unit 504 in the present step is the N-th reflection characteristic data.

Figure 8C:
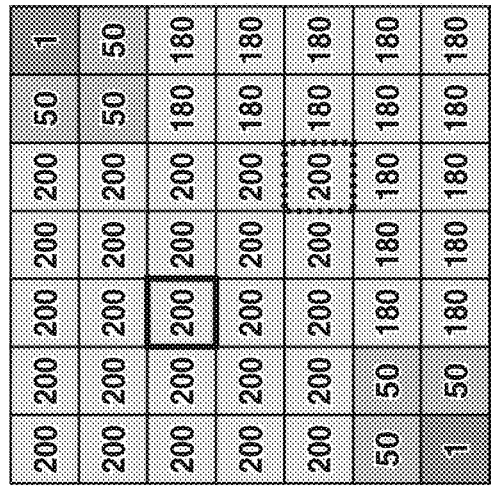
FIGS. 8A, 8B, 8C, 8D, and 8E illustrate the processing for calculating the number of peaks of the reflection intensity.
Figures 8B, 8E:
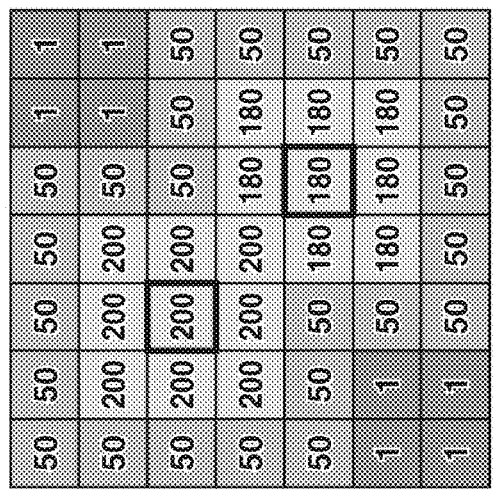
Figures 8A, 8D:
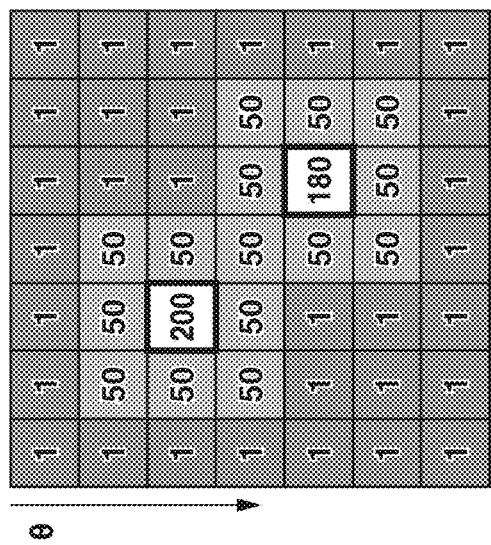

In step S603, the determination unit 505 generates peak number calculation data based on the plurality of pieces of image data and the geometric condition data. More specifically, the determination unit 505 generates image data indicating an image in which a pixel value $I(\varphi, \theta)$ is recorded at each of pixels with respect to each of the pixel positions (x, y). The image data generated at this time is image data with a $\varphi$ axis and a $\theta$ axis set on a horizontal direction and a vertical direction, respectively, and $\varphi$ and $\theta$ represent an azimuth angle and a zenith angle of the observation vector, respectively. The determination unit 505 acquires a plurality of pixel values $I_n(x, y)$ from the plurality of pieces of image data with respect to a certain pixel position (x, y). Further, the determination unit 505 records the acquired plurality of pixel values $I_n(x, y)$ at the respective pixels in the peak number calculation data, by referring to the azimuth angle $\varphi$ and the zenith angle $\theta$ of the observation vector corresponding to each of the acquired plurality of pixel values $I_n(x, y)$. This processing for generating the peak number calculation data is performed with respect to all of the pixel positions (x, y). FIG. 8A illustrates one example of the generated peak number calculation data. The peak number calculation data illustrated in FIG. 8A is the peak number calculation data corresponding to a certain pixel located at the pixel position (x, y).

Figure 7:
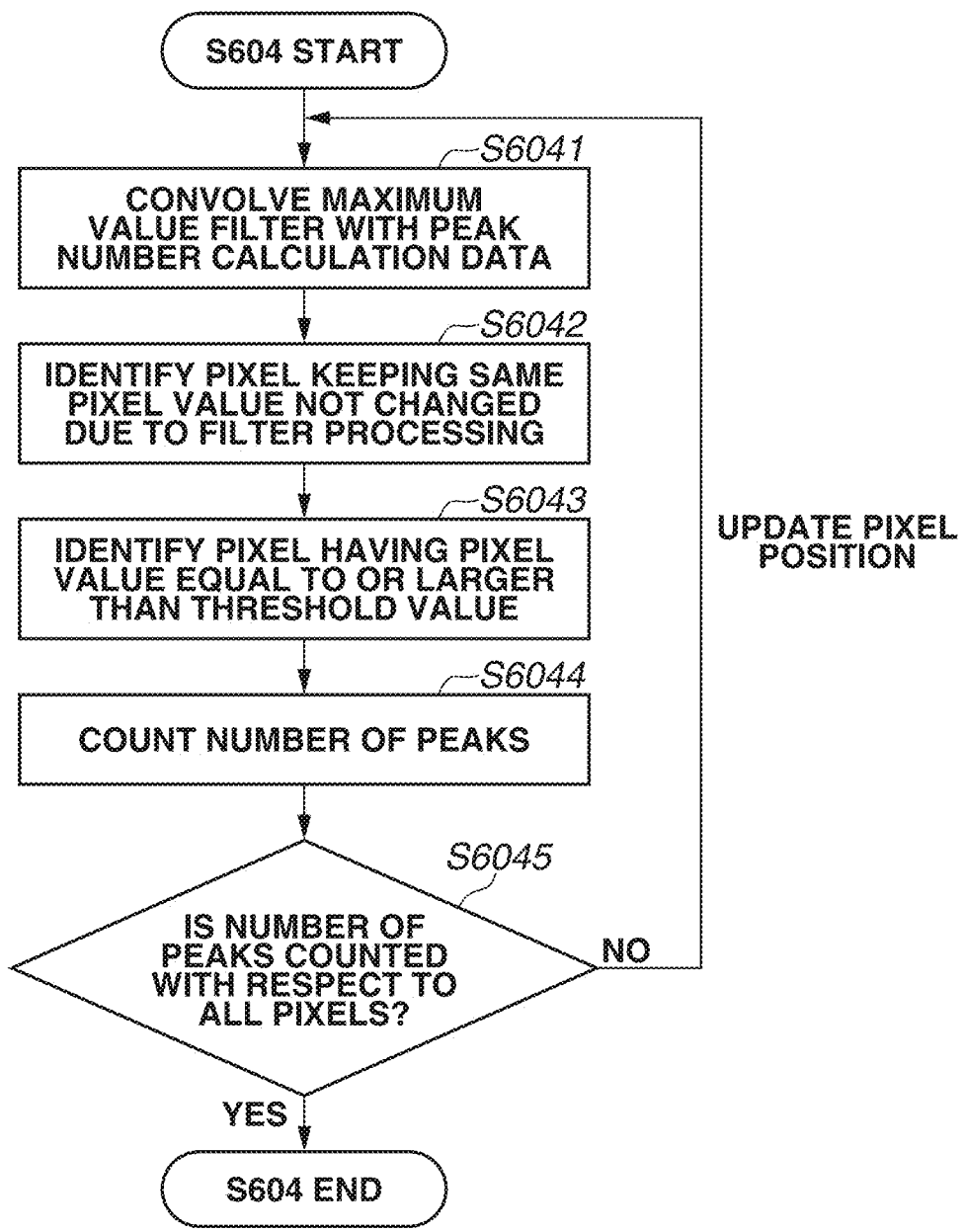
FIG. 7 is a flowchart illustrating processing for calculating the number of peaks of a reflection intensity.

In step S604, the determination unit 505 calculates the number of observed peaks of the reflection intensity with respect to each of the pixel positions (x, y). The number of peaks of the reflection intensity corresponds to a maximum value of the pixel value in a local region in the peak number calculation data, and the determination unit 505 thus calculates the number of peaks of the reflection intensity based on the peak number calculation data. FIG. 7 is a flowchart illustrating processing for calculating the number of observed peaks of the reflection intensity. In the following description, the processing for calculating the number of peaks of the reflection intensity in step S604 will be described with reference to FIG. 7.

In step S6041, the determination unit 505 convolves a maximum value filter with the peak number calculation data corresponding to the pixel of interest (x, y). A filter size of the maximum value filter is determined based on a value of the variance indicated by the reflection characteristic data generated in step S602. The value of the variance is a value indicating how much the specular reflected light spreads, and therefore can be used to identify in which range a value can be deemed as one peak of the reflection intensity. For example, when the variance has a large value, the filter size of the maximum filter is increased. FIG. 8B illustrates a result of the filter processing when the filter size is set to 3×3 pixels, and FIG. 8C illustrates a result of the filter processing when the filter size is set to 5×5 pixels. A pixel having a pixel value of 200 and a pixel having a pixel value of 180 that are surrounded by thick frames are detected as two peaks when the filter size is set to 3×3 pixels, while one pixel having the pixel value of 200 that is surrounded by a thick frame is detected as a peak when the filter size is set to 5×5 pixels. These results indicate that the number of calculated peaks varies depending on the filter size. The filter size of the maximum value filter may be a predetermined value. Further, the determination unit 505 may add processing for, when angles of the plurality of peaks are close to one another in the peak number calculation data, treating the plurality of peaks as one peak. FIG. 8D illustrates a result of reducing the resolution of the image illustrated in FIG. 8A, and FIG. 8E illustrates a result of convolving the maximum value filter having the filter size set to 3×3 pixels with the image illustrated in FIG. 8D. These results indicate that the number of calculated peaks becomes one due to the conversion of the resolution.

In step S6042, the determination unit 505 identifies the pixel position ($\varphi$, $\theta$) of the pixel having the same pixel value between before and after the processing in step S6041 in the peak number calculation data. In step S6043, the determination unit 505 identifies the pixel position ($\varphi$, $\theta$) of the pixel having a pixel value equal to or larger than a predetermined threshold value among pixels each located at the pixel position ($\varphi$, $\theta$) identified in step S6042. The threshold value used in step S6043 is a threshold value predetermined so as to prevent a peak of a small pixel value due to, for example, the influence of the noise from being counted as the peak of the reflection intensity. In step S6044, the determination unit 505 counts the number of pixel positions ($\varphi$, $\theta$) identified in step S6043 as the number of peaks of the reflection intensity.

In step S6045, the determination unit 505 determines whether the number of peaks of the reflection intensity is calculated with respect to all of the pixel positions (x, y). If the number of peaks of the reflection intensity is calculated with respect to all of the pixel positions (x, y) (YES in step S6045), the processing in step S604 is ended. The processing then proceeds to step S605. If the number of peaks of the reflection intensity is not calculated with respect to all of the pixel positions (x, y) (NO in step S6045), the pixel position (x, y) of the pixel of interest is updated and then the processing returns to step S6041.

In step S605, the determination unit 505 determines whether the number of peaks of the reflection intensity is one at as many pixel positions (x, y) as a predetermined threshold value or more. In the present exemplary embodiment, assume that the predetermined threshold value used in step S605 is the number of all the pixels in the image. If the number of peaks of the reflection intensity is one at as many pixel positions (x, y) as the predetermined threshold value or more (YES in step S605), the processing proceeds to step S606, if the number of peaks of the reflection intensity is one at pixel positions (x, y) fewer than the predetermined threshold value (NO in step S605), the processing proceeds to step S607.

In step S606, the resolution conversion unit 506 reduces the resolution of the image by the known method and outputs the image obtained after the resolution is converted to the image data holding unit 501. Then, the processing returns to step S601. In step S607, the determination unit 505 outputs the N−1-th reflection characteristic data held in the reflection characteristic data holding unit 504 to a storage device such as the HDD 113. When N is 1, the determination unit 505 outputs the first reflection characteristic data.

Beneficial Effects of Second Exemplary Embodiment

In the above-described manner, the image processing apparatus 1 according to the present exemplary embodiment determines how far the resolution of each of the captured images can be reduced to accurately calculate the reflection characteristic based on the number of peaks of the reflection intensity corresponding to each of the pixels in the images. As a result, the image processing apparatus 1 can reduce the influence of the noise when acquiring the reflection characteristic of the object, thereby accurately acquiring the reflection characteristic of the object.

In the following description, a third exemplary embodiment will be described. In the second exemplary embodiment, the image processing apparatus 1 determines whether to educe the resolution of each of the images based on the number of peaks of the reflection intensity corresponding to each of the pixels in the images, and reduces the resolution of the entire image according to the result of the determination. In the present exemplary embodiment, the image processing apparatus 1 locally reduces the resolution by averaging the pixel values region by region in the image based on the number of peaks and the direction of the peak of the reflection intensity corresponding to each of the pixels in the images. The image processing apparatus 1 according to the present exemplary embodiment has a similar hardware configuration and a similar functional configuration to those of the second exemplary embodiment, and therefore descriptions thereof will be omitted below. In the following description, the present exemplary embodiment will be described mainly focusing on differences between the present exemplary embodiment and the second exemplary embodiment. The present exemplary embodiment will be described assigning the same reference numerals to the similar configurations.

<Processing Performed by Image Processing Apparatus>

Figure 9:
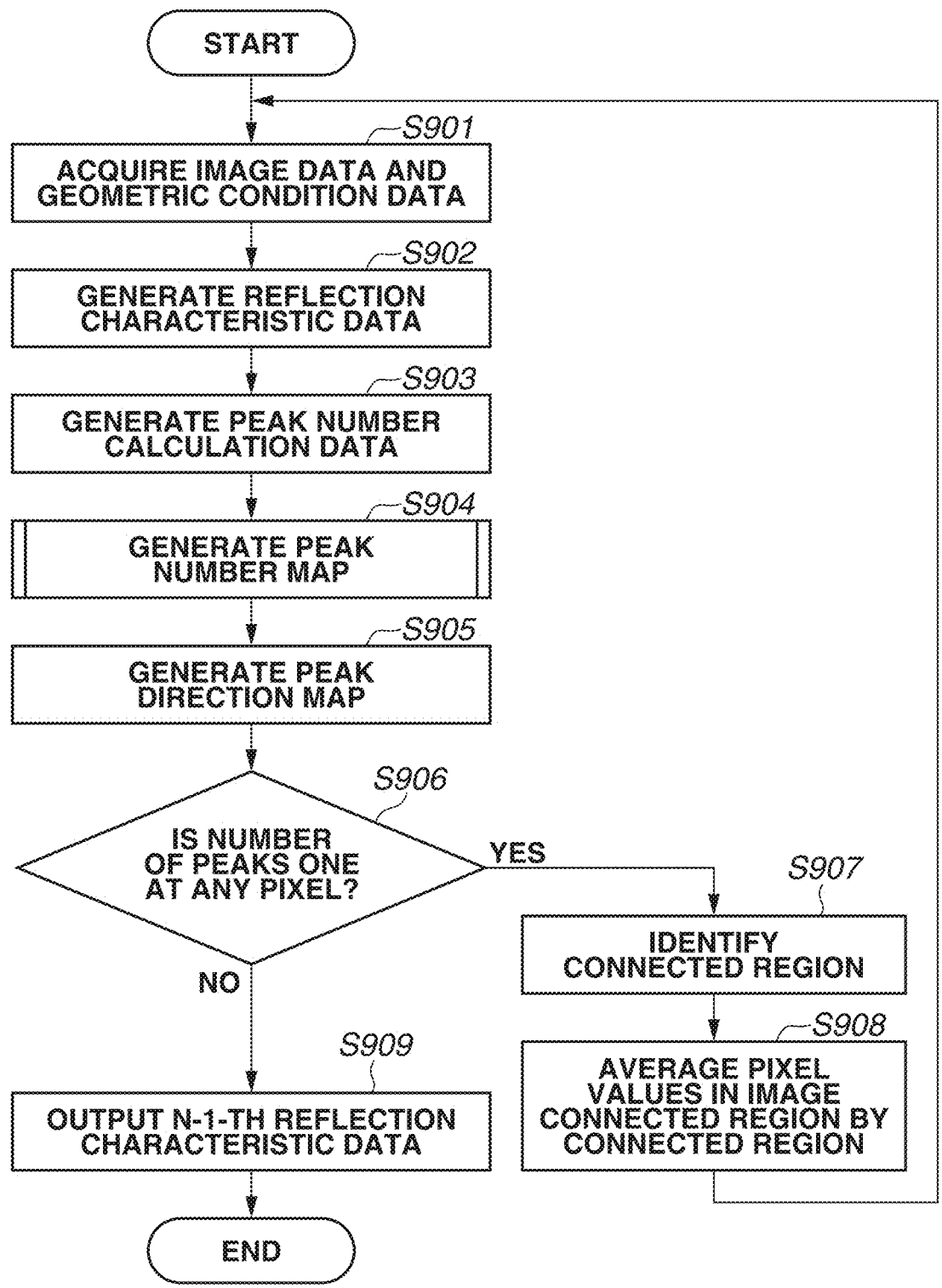
FIG. 9 is a flowchart illustrating processing performed by the image processing apparatus.

FIG. 9 is a flowchart illustrating processing performed by the image processing apparatus 1. In the following description, details of the processing performed by the image processing apparatus 1 will be described with reference to FIG. 9. The following processing is started when an instruction to start the processing is received from the user. Processing in steps S901 to S903 is similar to the processing in steps S601 to S603 according to the second exemplary embodiment, and therefore a description thereof will be omitted here.

In step S904, the determination unit 505 calculates the number of observed peaks of the reflection intensity with respect to each of the pixel positions (x, y). The number of peaks is calculated by a similar method to the second exemplary embodiment. Further, the determination unit 505 generates a peak number map in which the number of peaks is recorded at the pixel located at each of the pixel positions (x, y). In step S905, the determination unit 505 generates a peak direction map in which the direction ($\varphi_p$, $\theta_p$) of the peak of the reflection intensity is recorded at the pixel located at each of the pixel positions (x, y) based on the peak calculation data and the peak number map. For a pixel position at which a plurality of peaks is observed, the determination unit 505 does not acquire the peak direction, and sets (−1, −1) as the pixel value in the peak direction map.

In step S906, the determination unit 505 determines whether the number of peaks is one at one or more pixel positions (x, y) based on the peak number map. If the number of peaks is one at one or more pixel positions (x, y) (YES in step S906), the processing proceeds to step S907. If there is no pixel position (x, y) at which the number of peaks is one (NO in step S906), the processing proceeds to step S909.

In step S907, the resolution conversion unit 506 indefinites a region in which the number of peaks is one at pixels adjacent to each other as a connected region in the peak number map. Further, the resolution conversion unit 506 identifies a region in which the peak direction is the same at pixels adjacent to each other as a connected region in the peak direction map. In the peak direction map, the peak direction does not necessarily have to be completely the same at the pixels contained in one connected region, and an inside of a range determined based on the value of the variance indicated by the reflection characteristic data may be treated as the same peak direction. Further, the resolution conversion unit 506 identifies a common connected region between the connected region identified in the peak number map and the connected region identified in the peak direction map. In other words, each connected region identified at this time is formed by pixels at which the number of peaks is one and the peak direction is the same. Each connected region is labeled.

In step S908, the resolution conversion unit 506 averages the pixel values in the region in the captured image that corresponds to the connected region identified in step S907. In other words, in the region in which the adjacent pixels each have one peak of the reflection intensity in the same direction, the resolution conversion unit 506 converts the pixel values of the pixels contained in this region into an average value. The resolution conversion unit 506 outputs image data indicating an image in which the pixel values are averaged to the image data holding unit 501. Then, the processing returns to step S901. In step S909, the determination unit 505 outputs the N−1-th reflection characteristic data held in the reflection characteristic data holding unit 504 to a storage device such as the HDD 113. When N is 1, the determination unit 505 outputs the first reflection characteristic data.

Beneficial Effects of Third Exemplary Embodiment

In the above-described manner, the image processing apparatus 1 according to the present exemplary embodiment locally reduces the resolution by averaging the pixel values region by region in each of the images based on the number of peaks and the direction of the peak of the reflection intensity corresponding to each of the pixels in the images. As a result, the image processing apparatus 1 can reduce the influence of the noise when acquiring the reflection characteristic of the object, thereby accurately acquiring the reflection characteristic of the object.

Figure 10:
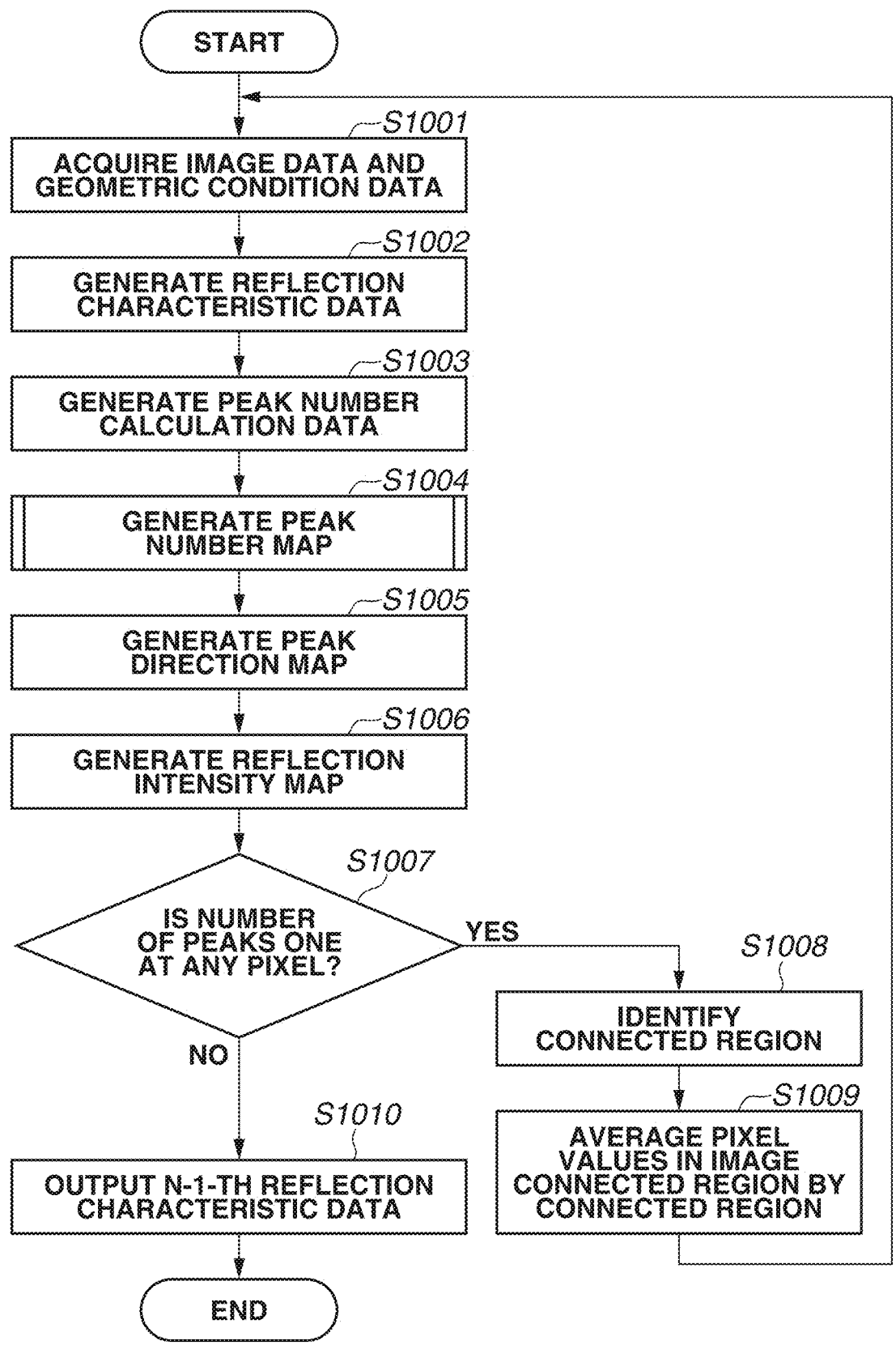
FIG. 10 is a flowchart illustrating processing performed by the image processing apparatus.

In the following description, a fourth exemplary embodiment will be described. In the third exemplary embodiment, the image processing apparatus 1 identifies the connected region based on the number of peaks and the direction of the peak of the reflection intensity corresponding to each of the pixels in the images, and locally reduces the resolution by averaging the pixel values in each connected region. In the present exemplary embodiment, the image processing apparatus 1 identifies the connected region based on three factors, the number of peaks of the reflection intensity, the direction of the peak of the reflection intensity, and the reflection intensity corresponding to each of the pixels in the images. The image processing apparatus 1 according to the present exemplary embodiment has a similar hardware configuration and a similar functional configuration to those of the third exemplary embodiment, and therefore descriptions thereof will be omitted below. In the following description, the present exemplary embodiment will be described mainly focusing on differences between the present exemplary embodiment and the third exemplary embodiment. The present exemplary embodiment will be described assigning the same reference numerals to the similar configurations.
<Processing Performed by Image Processing Apparatus>
FIG. 10 is a flowchart illustrating processing performed by the image processing apparatus 1. In the following description, details of the processing performed by the image processing apparatus 1 will be described with reference to FIG. 10. The following processing is started when an instruction to start the processing is received from the user. Processing in steps S1001 to S1005 is similar to the processing in steps S901 to S905 according to the third exemplary embodiment, and therefore a description thereof will be omitted here.

In step S1006, the determination unit 505 generates a peak intensity map in which a reflection intensity at the peak of the reflection intensity is recorded at a pixel located at each of the pixel positions (x, y) based on the reflection characteristic data. In step S1007, the determination unit 505 determines whether the number of peaks is one at one or more pixel positions (x, y) based on the peak number map. If the number of peaks is one at one or more pixel positions (x, y) (YES in step S1007), the processing proceeds to step S1008. If there is no pixel position (x, y) at which the number of peaks is one (NO in step S1007), the processing proceeds to step S1010.

In step S1008, the resolution conversion unit 506 indefinites the region in which the number of peaks is one at the pixels adjacent to each other as the connected region in the peak number map. Further, the resolution conversion unit 506 identifies the region in which the peak direction is the same at the pixels adjacent to each other as the connected region in the peak direction map. Further, the resolution conversion unit 506 identifies a region in which the peak reflection intensity is the same at pixels adjacent to each other as a connected region in the reflection intensity map. In the reflection intensity map, the reflection intensity does not necessarily have to be completely the same at the pixels contained in one connected region, and pixels at which a difference in the reflection intensity is smaller than a predetermined threshold value may be treated as the pixels at which the reflection intensity is the same. Further, the resolution conversion unit 506 identifies a common connected region between the connected region identified in the peak number map, the connected region identified in the peak direction map, and the connected region identified in the reflection intensity map, in other words, each connected region identified at this time is formed by pixels at which the number of peaks is one, the peak direction is the same, and the peak reflection intensity is the same. Each connected region is labeled.

In step S1009, the resolution conversion unit 506 averages the pixel values in the region in the captured image that corresponds to the connected region identified in step S1008. In other words, in the region in which the adjacent pixels each have one peak of the same reflection intensity in the same direction, the resolution conversion unit 506 converts the pixel values of the pixels contained in this region into the average value. The resolution conversion unit 506 outputs image data indicating an image in which the pixel values are averaged to the image data holding unit 501. Then, the processing returns to step S1001. In step S1010, the determination unit 505 outputs the N−1-th reflection characteristic data held in the reflection characteristic data holding unit 504 to a storage device such as the HDD 113. When N is 1, the determination unit 505 outputs the first reflection characteristic data.

Beneficial Effects of Fourth Exemplary Embodiment

In the above-described manner, the image processing apparatus 1 according to the present exemplary embodiment locally reduces the resolution by averaging the pixel values region by region in each of the images based on the number of peaks of the reflection intensity, the direction of the peak of the reflection intensity, and the reflection intensity corresponding to each of the pixels in the images. As a result, the image processing apparatus 1 can reduce the influence of the noise when acquiring the reflection characteristic of the object, thereby accurately acquiring the reflection characteristic of the object.

OTHER EXEMPLARY EMBODIMENTS

The image processing apparatus 1 employs the reflection model expressed by the Gaussian function as the reflection model for use in the calculation of the reflection characteristic in the above-described exemplary embodiments, but may calculate the reflection characteristic with use of another reflection model, such as a Torrance-Sparrow model and a Phong model.

The resolution of the image is converted by the image processing in the above-described exemplary embodiments, but the resolution of the image may be converted by acquiring an image captured again at a different resolution.

The resolution of the image is reduced until the number of peaks becomes two or more in the above-described exemplary embodiments, but the method for reducing the resolution is not limited to the above-described one example. For example, the image processing apparatus 1 reduces the resolution of the image to a plurality of resolutions, and determines the number of peaks with respect to the image at each of the resolutions in parallel with one another. The image processing apparatus 1 may identify the resolution of the image that is to be used for calculation of the reflection characteristic as a result of the determination and output the reflection characteristic data generated based on the image at the identified resolution. The image processing apparatus 1 converts the resolution of the image into the resolution directly specified by the user in the first exemplary embodiment, but may acquire the resolution with use of a lookup table in which information specified by the user and the resolution are associated with each other and convert the resolution of the image into the acquired resolution.

Examples of the information specified by the user include information regarding a factor affecting the reflection characteristic of the object, such as information regarding a material of the targeted object and information regarding surface processing such as coating.

According to an aspect of the embodiments, the reflection characteristic of the object can be accurately acquired based on the image containing the noise.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-204380, filed Oct. 30, 2018, which is hereby incorporated by reference herein in its entirety.

What is claimed is:

1. An apparatus comprising:
one or more processors; and
one or more memories storing instructions, when executed by the one or more processors, causing the apparatus to function as:
a first acquisition unit configured to acquire a plurality of images acquired by imaging an object under a plurality of geometric conditions based on an imaging position and a position of a light source that irradiates the object with light;
a determination unit configured to determine one resolution of a plurality of resolutions at which a number of peaks is one regarding a peak of a pixel value that emerges in a corresponding relationship between the pixel value and a geometric condition at each of pixel positions in the plurality of images acquired by the first acquisition unit; and
a conversion unit configured to convert, by executing a resolution conversion processing on the plurality of images acquired by the first acquisition unit, the resolution of each of the plurality of images into the determined resolution.

2. The apparatus according to claim 1, wherein the number of peaks is one at as many pixel positions as a predetermined threshold value or more in the plurality of images in each of which the resolution has been converted.

3. The apparatus according to claim 1, wherein the one or more memories storing instructions, when executed by the one or more processors, causes the data processing apparatus to further function as a generation unit configured to generate reflection characteristic data indicating a reflection characteristic of the object based on the plurality of images in each of which the resolution has been converted.

4. The apparatus according to claim 3, wherein the one or more memories storing instructions, when executed by the one or more processors, causes the data processing apparatus to further function as a determining unit configured to determine whether the number of peaks is one or fewer in the plurality of images,
wherein the generation unit outputs the reflection characteristic data based on a result of the determination by the determining unit.

5. The apparatus according to claim 4, wherein the determining unit calculates the number of peaks based on the plurality of images, and determines whether the number of peaks is one or fewer in the plurality of images based on the calculated number of peaks.

6. The apparatus according to claim 5, wherein the determining unit calculates the number of peaks by filter processing using a maximum value filter.

7. The apparatus according to claim 1, wherein the determination unit determines the resolution based on an instruction of a user.

8. The apparatus according to claim 1, wherein the conversion unit reduces the resolution of each of the plurality of images to the determined resolution.

9. The apparatus according to claim 8, wherein the conversion unit locally reduces the resolution of each of the plurality of images by averaging pixel values of pixels contained in a region in the image.

10. The apparatus according to claim 9, wherein the conversion unit identifies the region targeted for averaging the pixel values in the image based on the number of peaks and a direction of the peak.

11. The apparatus according to claim 10, wherein the conversion unit identifies the region targeted for averaging the pixel values in the image based on the number of peaks, the direction of the peak, and a reflection intensity.

12. The apparatus according to claim 3, wherein the generation unit generates the reflection characteristic data by fitting a reflection model to the pixel values in the plurality of images in each of which the resolution has been converted.

13. The apparatus according to claim 12, wherein the reflection model is a reflection model expressed by a Gaussian function, a Torrance-Sparrow model or a Thong model.

14. The apparatus according to claim 3, wherein the one or more memories storing instructions, when executed by the one or more processors, causes the data processing apparatus to further function as a second acquisition unit configured to acquire an observation vector indicating a direction from a surface of the object toward an imaging device, a light source vector indicating a direction from the surface of the object toward a light source, and an illumination intensity indicating an intensity of light with which the light source irradiates the object,
- wherein the generation unit generates the reflection characteristic data further based on the observation vector, the light source vector, and the illumination intensity.

15. The apparatus according to claim 1, wherein the object is an object containing a metallic flake on a surface thereof.

16. The apparatus according to claim 1, wherein the peak of the pixel value that emerges in the corresponding relationship is a peak of the pixel value that is indicated in a graph with the pixel value and the geometric condition set on axes thereof.

17. A method comprising:
- acquiring a plurality of images acquired by imaging an object under a plurality of geometric conditions based on an imaging position and a position of a light source that irradiates the object with light;
- determining one resolution of a plurality of resolutions at which a number of peaks is one regarding a peak of a pixel value that emerges in a corresponding relationship between the pixel value and a geometric condition at each of pixel positions in the plurality of images; and
- converting, by executing a resolution conversion processing on the plurality of images, the resolution of each of the plurality of images into the determined resolution.

18. A non-transitory computer-readable storage medium storing instructions that, when executed by a computer, cause the computer to perform a method, the method comprising:
- acquiring a plurality of images acquired by imaging an object under a plurality of geometric conditions based on an imaging position and a position of a light source that irradiates the object with light;
- determining one resolution of a plurality of resolutions at which a number of peaks is one regarding a peak of a pixel value that emerges in a corresponding relationship between the pixel value and a geometric condition at each of pixel positions in the plurality of images; and
- converting, by executing a resolution conversion processing on the plurality of images, the resolution of each of the plurality of images into the determined resolution.

19. The apparatus according to claim 1, wherein the one or more memories storing instructions, when executed by the one or more processors, causes the data processing apparatus to further function as an imaging control unit configured to control an image capturing for the plurality of images.

* * * * *